Sept. 19, 1939.   R. H. BECKMAN   2,173,195
WHEEL STRUCTURE
Filed March 25, 1937   2 Sheets-Sheet 2
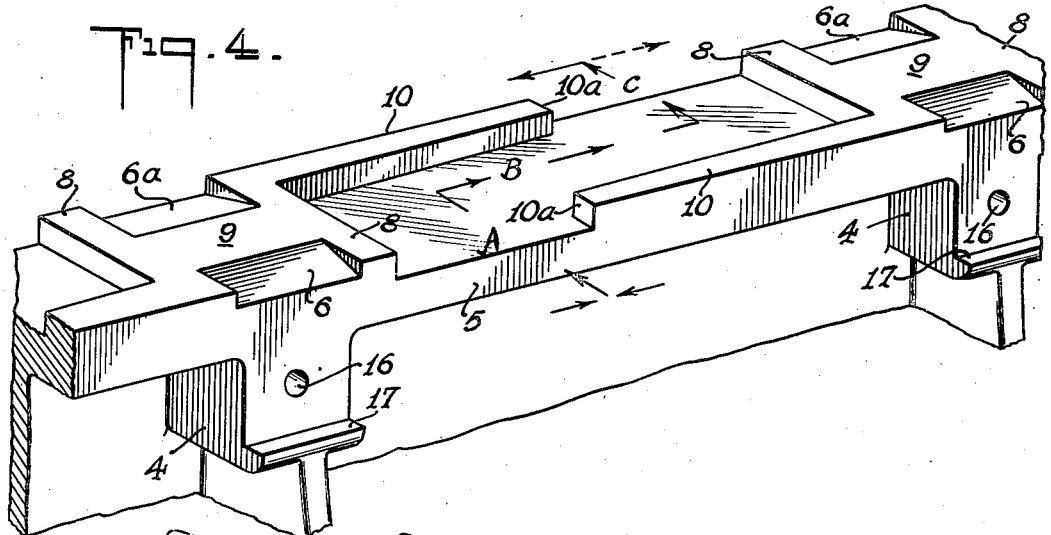
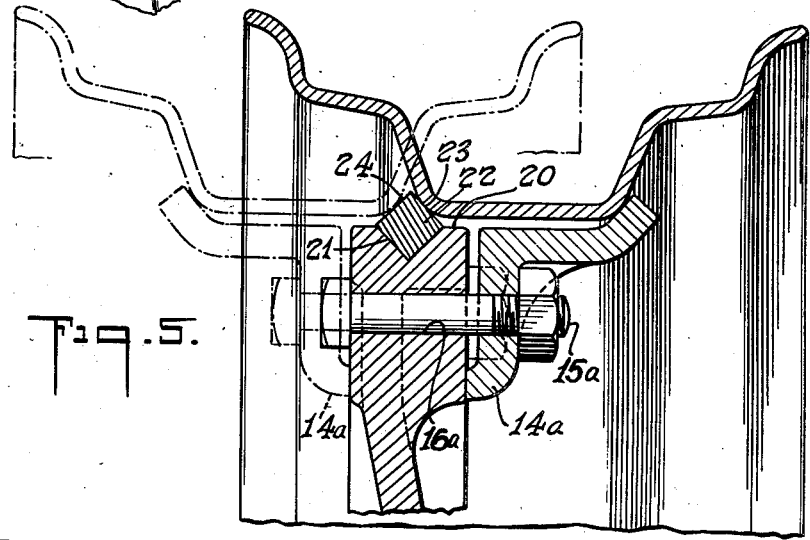
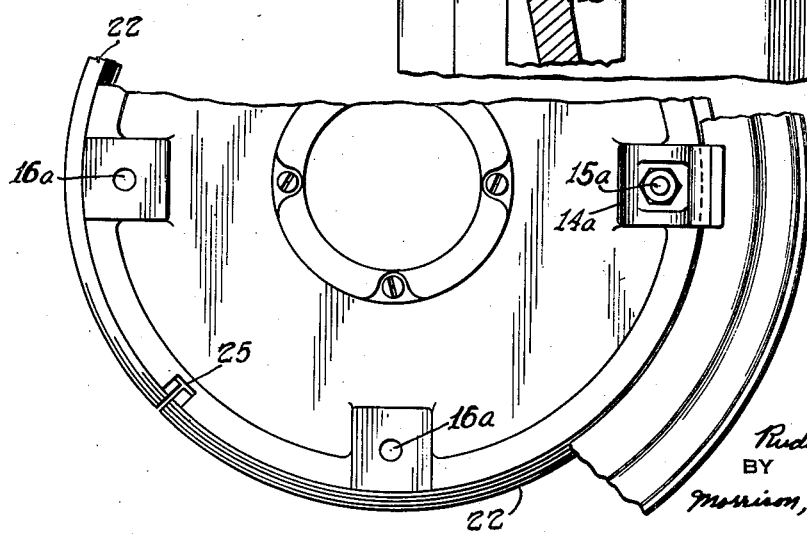
INVENTOR
Rudolph H. Beckman
BY
Morrison, Kennedy & Campbell
ATTORNEYS.

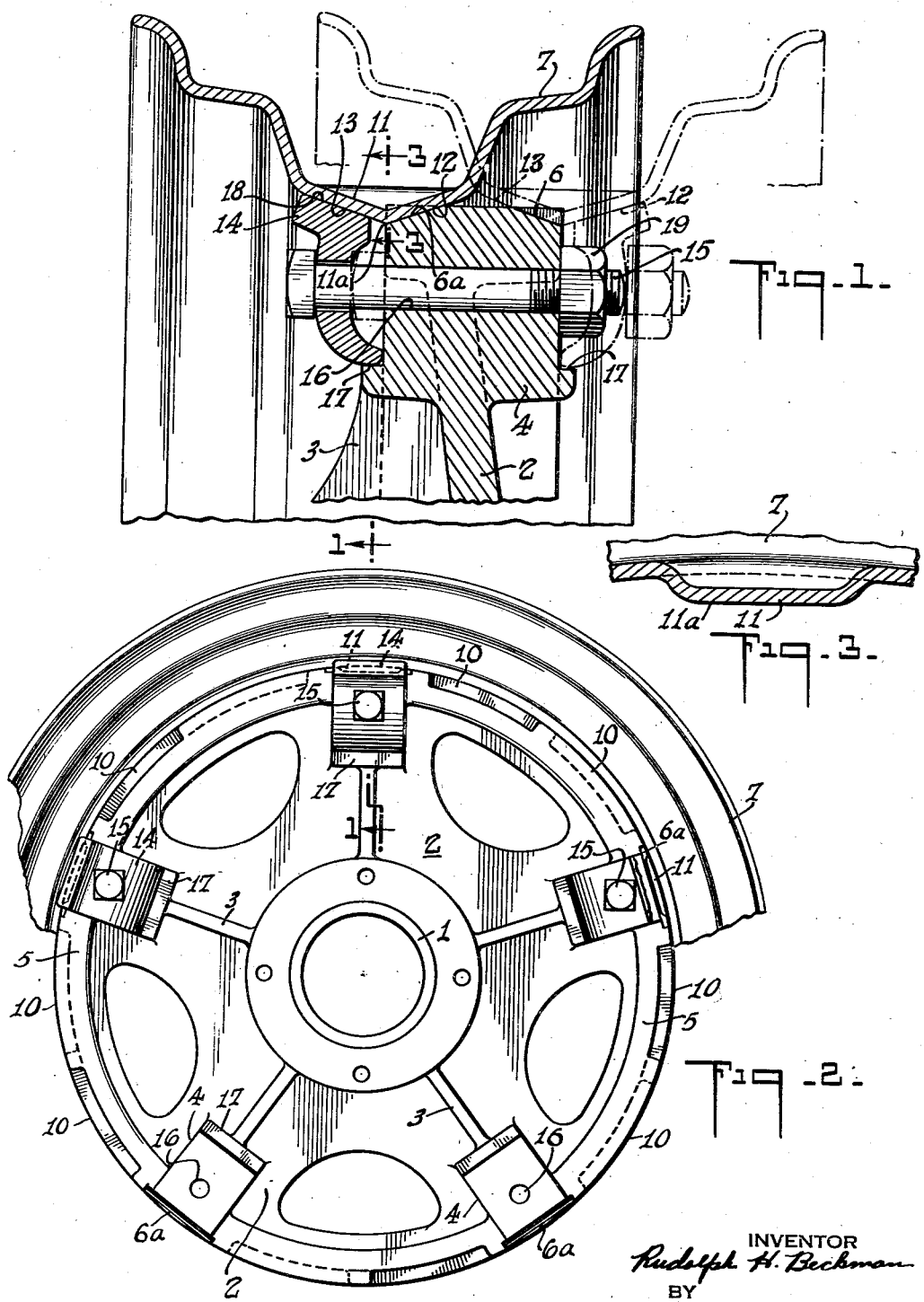

Patented Sept. 19, 1939

2,173,195

UNITED STATES PATENT OFFICE 2,173,195

WHEEL STRUCTURE

Rudolph H. Beckman, Davenport, Iowa, assignor to French & Hecht, Incorporated, a corporation of Iowa Application March 25, 1937, Serial No. 132,949

10 Claims. (Cl. 301—11)

This invention relates to wheel structures, and particularly to wheels for vehicles whose use requires or makes it desirable that the track of the wheels, that is the lateral distance between their traction surfaces, may be varied. The class of vehicles to which the invention is mainly directed is that including tractors and farm machinery where, either because of the character of the landscape or because of the varying manner in which different kinds of vegetation are planted, it would be impossible to adapt a tractor or other farm machinery for many uses if it were not possible to vary the track of the wheels.

The present invention is related, in its broader aspects, to that set forth in a copending application, Ser. No. 55,780, since eventuated into Patent No. 2,129,807, to myself and John H. Ploehn, which discloses means for adjusting a demountable rim to different axial positions relatively to the hub of the wheel. According to the patented structure, the rim is adjustably secured to a series of upstanding lugs arranged equidistant from the axis of the wheel in spaced relation circumferentially thereof. While the arrangement is highly satisfactory for its intended purpose, nevertheless it is frequently desirable to move a vehicle from one place to another in the factory and from the factory to the warehouse before the demountable rim (carrying any type of traction surface) is applied to the wheel, and this cannot be done with the patented structure without causing injury to the upstanding lugs on the wheel and to the surface over which it travels.

It is a prime object of the present invention, therefore, to provide a wheel structure for supporting a demountable rim in different axial positions thereon which presents a peripheral running surface substantially continuous in a circumferential direction when the rim is demounted and, yet, which will permit the rim to be moved axially thereof to locate it in said different positions.

According to one embodiment of the invention, the wheel structure includes a felly or corresponding member formed on its periphery with a series of raised lugs arranged in spaced relation circumferentially thereof and having their opposite side edges recessed to form correspondingly inclined bearing surfaces adapted to support a demountable rim at one side or the other of the felly, the formation of the bearing surfaces leaving each lug with substantially an H-shaped peripheral surface. Intermediate adjacent lugs, two ribs are arranged along the opposite peripheral edges of the felly and extend each from one lug toward the other so that their ends overlap. The peripheral surfaces of the lugs and ribs are equidistant from the axis of the wheel, so that together they form a running surface on the felly which is continuous in a circumferential direction. The inside diameter of the rim is greater than the outside diameter of the peripheral running surface of the felly and is formed with a series of radially inwardly projecting lugs arranged to cooperate with the inclined bearing surfaces of the lugs on the felly, the rim lugs being of such dimensions as to pass freely through the space provided between the ends of the ribs and the lugs on the felly and between the ribs themselves to permit the rim to be moved axially of the felly to locate it at either side thereof.

According to an alternative arrangement, the felly presents a peripheral running surface which is smooth, that is unbroken, save for a circumferentially extending V-shaped groove formed therein. The groove is adapted to accommodate a split ring, square in cross section and which, when arranged in the groove, presents oppositely inclined side faces projecting above the peripheral surface of the felly to form bearing surfaces to support the rim on either side thereof, the removal of the ring from the groove when the rim is demounted rendering it possible to shift the rim axially of the felly.

In the accompanying drawings, the invention has been shown merely by way of example and in preferred form and obviously many variations and modifications thereof may be made which will still be comprised within its spirit. It should be understood, therefore, that the invention is not limited to any specific form or embodiment except insofar as such limitations are specified in the appended claims.

Referring to the drawings:

Fig. 1 is a cross-sectional view of the wheel felly and demountable rim, taken on the line 1—1 of Fig. 2, looking in the direction of the arrows;

Fig. 2 is a side elevation of the wheel and rim, the latter being partly broken away;

Fig. 3 is a fragmentary sectional view of a rim lug, taken on the line 3—3 of Fig. 1, looking in the direction of the arrows;

Fig. 4 is a flattened perspective view of a portion of the wheel felly;

Fig. 5 is a cross-sectional view of a wheel felly and rim mounted thereon, showing a modification of the invention; and Fig. 6 is a side elevation of a portion of the wheel structure in Fig. 5, parts being broken to show their arrangement.

In the embodiment illustrated in Figs. 1 to 4, there is shown a disk type of wheel including a hub 1, a disc 2 reinforced by side ribs 3, and a series of raised lugs 4 arranged in spaced relation circumferentially of the disc 2 and whose peripheral surfaces are equidistant from the axis of the wheel. The lugs 4 are connected by intermediate webs 5 which form therewith a circumferentially continuous felly or main wheel rim of the same width as the lugs. The lugs 4 are recessed at opposite side edges to form two series of correspondingly inclined bearing surfaces 6 and 6a, respectively, adapted for supporting a demountable rim 7 at one side or the other of the felly, as desired. The recessing of the lugs 4 to form the bearing surfaces 6 and 6a cuts the peripheral surfaces of the lugs into substantially the shape of a letter H, that is, with two legs 8 extending transversely of the felly throughout the full width thereof and a circumferentially extending cross bar 9 connecting the legs. Intermediate adjacent lugs 4, two ribs 10 are formed along the opposite peripheral edges of the felly each extending from one lug toward the other so that their ends 10a overlap. With this arrangement, the peripheral surfaces 8 and 9 of the lugs 4 and the peripheral surfaces of the ribs 10, all of which are equidistant from the axis of the wheel, form a running surface on the wheel felly which is continuous in a circumferential direction.

As shown in Figs. 1 to 4, the ribs 10 taper slightly toward their free ends and are substantially of the same length, each extending more than half the distance between the adjacent lugs 4. However, it is pointed out that the desired result may be obtained if the ribs 10 are of different lengths and overlap, provided the free end of each terminates a given distance short of the respective lug 4 toward which the rib extends, for a purpose to be pointed out hereinafter. Moreover, the arrangement obviously is not limited to an overlapping of the ends of the ribs, although such arrangement is preferred, since if the ends of the ribs substantially approached a given transverse line intermediate the lugs 4 the running surface provided would be continuous for all practical purposes.

The demountable rim 7 has an inside diameter greater than the outside diameter of the said continuous running surface of the wheel felly and is adapted to be secured at either side thereof, supported by one or the other series of bearing surfaces 6 or 6a. At spaced intervals corresponding to the distance circumferentially between the bearing surfaces 6, 6 and 6a, 6a on the lugs 4, the rim 7 is formed with radially inwardly projecting lugs 11, which converge from opposite sides to a point along the median circumferential line of the rim 7 and present oppositely and correspondingly inclined surfaces 12 and 13 adapted to fit between the legs 8 of the lugs 4 and seat against the bearing surfaces 6 or 6a, as the case may be. The rim 7 is secured at either side of the felly 2 by a plurality of clamping lugs 14 fastened by bolts 15 passing through the clamping lugs 14 and holes 16 in the lugs 4, the clamping lugs 14 being arranged with their lower ends resting on shoulders 17 formed on the side faces of the lugs 4 and their upper enlarged and beveled ends 18 drawn into engagement with one of the inclined surfaces 12 or 13 on the lugs 11 (depending upon which side of the felly the rim is arranged) by the tightening of nuts 19 on the bolts 15.

With the foregoing arrangement, but three slight movements of the demountable rim 7 are required to shift it axially of the wheel; first an axial movement, then a circumferential movement, and finally another axial movement. Referring to Fig. 4, the lugs 11 on the rim are first alined with the openings indicated by the letter A between the lugs 4 and the ends of the ribs 10 on the axially outer peripheral edge of the felly, the openings A being sufficiently large to allow the lugs 11 to pass freely therethrough. The rim 7 is then moved axially of the felly until the apices 11a of the lugs 11 are moved approximately to the center of the felly. A circumferential movement of the rim 7 in the direction of the arrows carries the lugs 11 through the space B between the ribs 10 until they reach a position where a second axial movement of the rim causes them to pass through the opening C between the lugs 4 and the ribs 10 at the axially inner edge of the felly. The lugs 11 being then clear of the felly, the rim may be rotated either in a clockwise or anti-clockwise direction until the lugs 11 aline with and can be seated on the bearing surfaces 6a. The bolts 15, which have been withdrawn, are again inserted through the holes 16 in the felly with the clamping lugs 14 now arranged at the axially inner side of the felly and the nuts 19 then tightened to clamp the rim 7 in place. It will be noted that the arrangement provides that the nuts 19 will always be at the axially outer side of the wheel and readily accessible, the changeover of the rim merely requiring that the bolts 15 be withdrawn to locate the clamping lugs 14 at the inside instead of at the outside of the felly. Of course, to again locate the rim at the axially outer edge of the felly, the bolts 15 and clamping lugs 14 are removed and the steps involved in shifting the rim axially of the felly are carried out in the reverse order from those already set forth.

Figs. 5 and 6 illustrate a modification of the invention wherein the outside diameter of the continuous running surface of the wheel rim or felly is less than the inside diameter of the smooth radially inner side of the rim 7, so that the latter is freely movable axially of the felly. In this instance, however, the peripheral or running surface 20 of the felly is smooth and unbroken save for the formation therein of a continuous circumferentially extending V-shaped groove 21 adapted to accommodate a split ring 22. The ring 22 is square in cross section and when arranged in the groove 21 presents two side faces 23 and 24 projecting above the surface 20 and being angularly disposed to form bearing surfaces for supporting the rim 7 at either side of the felly, as indicated by the full and dotted lines in Fig. 5. At intervals circumferentially of the felly, a series of transverse recesses 25 are formed therein which extend throughout its width. The recesses 25 are of slightly greater depth than the circumferential groove 21 and the split ring 22 is adapted to be arranged in the groove with its ends located in the recesses 25 or in close proximity thereto so that the ring may be sprung out of the groove by the insertion of a suitable tool beneath one of its ends. The rim 7 is held in place by clamping lugs 14a, as in the embodiment shown in Figs. 1 to 4, fastened to the felly as by bolts 15a passing through holes 16a therein and which lugs are adapted to be arranged at either side of the felly to clamp the rim 7 in either its axially inner or outer position relatively thereto. In this instance, however, the clamping lugs 14a are of slightly different form for cooperation with the rim 7 due to the absence of supporting lugs on the radially inner surface of the rim.

In order to locate the rim 7 at either side of the felly, it is only necessary to demount the rim, remove the ring 22 from the groove 21, shift the rim axially over the felly, and then replace the ring 22 and clamp the rim in position with the clamping lugs 14a arranged at the other side of the felly.

It is pointed out that the structure and arrangement of parts shown in Figs. 5 and 6 are merely by way of example and may be modified and varied without departing from the invention. For example, the extent of axial variation of the position of the rim 7 relatively to the felly could be increased by providing a wider felly formed with two grooves 21, one near each edge, whereby a single ring 22 could be arranged in one groove to support the rim at one side of the felly and in the other groove to support the rim at the other side of the felly.

Having thus described my invention what I claim is:

1. In a wheel structure, the combination of a felly presenting a peripheral running surface substantially continuous in a circumferential direction, a demountable rim adapted to be supported on the felly, and a quick detachable circumferentially extending member arranged on the felly and providing bearing surfaces for supporting the rim in different axial positions relatively to the felly.

2. In a wheel structure, the combination of a felly presenting a peripheral running surface substantially continuous in a circumferential direction and formed with a circumferentially extending groove, a demountable rim adapted to be supported on the felly, and a quick detachable split ring fitted in the groove and presenting bearing surfaces for engaging and supporting the rim on either side thereof.

3. In a wheel structure, the combination of a felly presenting a peripheral running surface substantially continuous in a circumferential direction and formed with a circumferentially extending V-shaped groove, a demountable rim adapted to be supported on the felly, and a split ring arranged in the groove, said ring being square in cross section and presenting oppositely inclined side faces projecting above the peripheral surface of the felly to form bearing surfaces for supporting the rim on either side thereof, the removal of the ring when the rim is demounted rendering the rim movable axially of the felly to locate it in the desired position.

4. In a wheel structure, the combination of a felly, a demountable rim, and oppositely inclined bearing surfaces provided on the felly for the engagement of the rim therewith to support the latter in different axial positions relatively to the felly, the parts being constructed and arranged so that the rim may be moved axially of the felly to one position or another and the felly presenting a peripheral running surface substantially continuous in a circumferential direction when the rim is demounted.

5. In a wheel structure, the combination of a felly, a demountable rim, and axially disposed oppositely inclined bearing surfaces provided on the felly for the engagement of the rim therewith to support the latter at one side or the other of the felly, the parts being constructed and arranged so that the rim may be moved axially of the felly to locate it at either side of the felly and the felly presenting a peripheral running surface substantially continuous in a circumferential direction when the rim is demounted.

6. In a wheel structure, the combination of a felly, a demountable rim, a series of lugs formed on the felly in spaced relation circumferentially thereof and having lateral bearing surfaces to support the rim at one side or the other of the felly, and a pair of ribs arranged between adjacent lugs along the opposite peripheral edges of the felly and extending each from one lug toward the other for substantially half the distance between said lugs, the peripheral surfaces of the lugs and ribs being equidistant from the axis of the wheel and presenting a running surface on the felly substantially continuous in a circumferential direction when the rim is demounted.

7. In a wheel structure, the combination of a felly, a demountable rim, a series of lugs formed on the felly in spaced relation circumferentially thereof and having lateral bearing surfaces to support the rim at one side or the other of the felly, and a pair of ribs arranged between adjacent lugs along opposite peripheral edges of the felly and extending each from one lug toward the other with their ends overlapping, the peripheral surfaces of the lugs and ribs being equidistant from the axis of the wheel and presenting a running surface on the felly continuous in a circumferential direction when the rim is demounted.

8. A wheel structure as in claim 6, wherein the inside diameter of the rim is greater than the outside diameter of said running surface and the rim is formed with a series of radially inwardly projecting lugs arranged to cooperate with the bearing surfaces of the lugs on the felly.

9. A wheel structure as in claim 6, wherein the inside diameter of the rim is greater than the outside diameter of said running surface and the rim is formed with a series of radially inwardly projecting lugs arranged to cooperate with the bearing surfaces of the lugs on the felly, and wherein the space circumferentially between adjacent lugs and the ends of the intermediate ribs and the space between the ribs transversely of the felly provide passages through which the lugs on the rim may be guided to move the rim from one side of the felly to the other.

10. A wheel structure including a felly formed on its periphery with a series of raised lugs arranged in spaced relation circumferentially thereof and having correspondingly inclined side edges adapted for supporting a demountable rim at one side or the other of the felly, and two ribs formed along the opposite peripheral edges of the felly between adjacent lugs each extending from one lug toward the other for more than half the distance between said lugs, the peripheral surfaces of the lugs and ribs being equidistant from the axis of the wheel so that the felly presents a running surface continuous in a circumferential direction when the rim is demounted.

RUDOLPH H. BECKMAN.